United States Patent [19]

Müller-Horsche et al.

[11] Patent Number: 5,247,535
[45] Date of Patent: Sep. 21, 1993

[54] APPARATUS FOR PREIONIZATION OF GAS IN A PULSED GAS LASER

[75] Inventors: Elmar Müller-Horsche, Kissing; Ludwig Köhler, Göttingen; Bernd Keller, Bovenden, all of Fed. Rep. of Germany

[73] Assignee: Lambda Physik Forschungsgesellschaft mbH, Gottingen, Fed. Rep. of Germany

[21] Appl. No.: 849,761

[22] Filed: Mar. 12, 1992

[30] Foreign Application Priority Data

Mar. 15, 1991 [DE] Fed. Rep. of Germany ....... 4108472

[51] Int. Cl.⁵ .............................................. H01S 3/097
[52] U.S. Cl. ........................................ 372/86; 372/87; 372/34; 372/5; 372/61; 372/69
[58] Field of Search ..................... 372/92, 34, 87, 86, 372/5, 61, 69

[56] References Cited

U.S. PATENT DOCUMENTS 4,592,065  5/1986  de Witte ................................ 372/86
4,611,327  9/1986  Clark et al. ........................... 372/20

FOREIGN PATENT DOCUMENTS 63-217677  9/1988  Japan .
63-217678  9/1988  Japan .
 1-28482   5/1989  Japan .

OTHER PUBLICATIONS

"Modern Dispenser Cathodes" by J. H. Cronin, Ph.D., I.E.E.E. Proc., vol. 128, Bt. 1, No. 1, Feb. 1981, pp. 19–32.

Primary Examiner—Léon Scott, Jr.
Attorney, Agent, or Firm—Brumbaugh Graves Donohue & Raymond

[57] ABSTRACT

An apparatus for preionization of gas in a pulsed gas laser by means of soft X-ray radiation comprises an elongated cathode (26) which is heated by thermal radiation or electron bombardment and which is arranged parallel to a likewise elongated anode (18) in an evacuated housing.

7 Claims, 1 Drawing Sheet

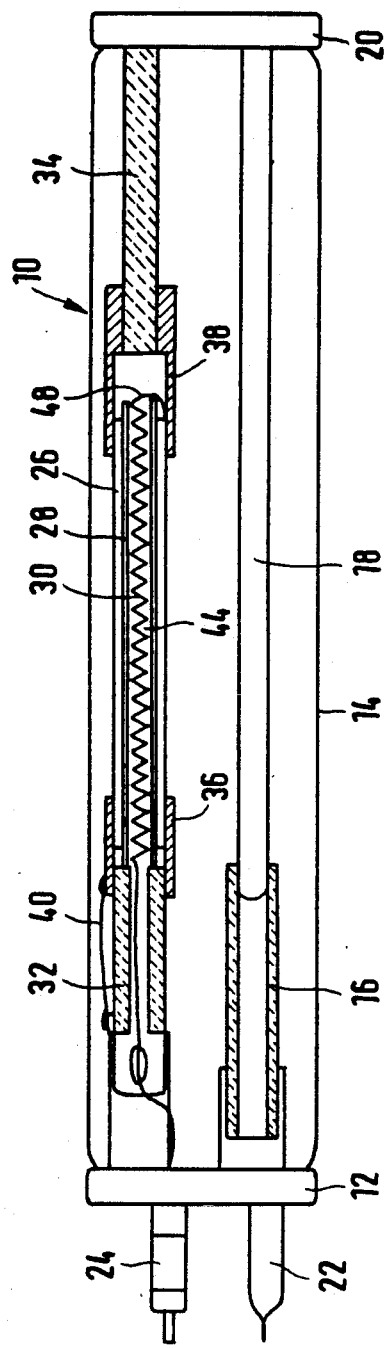
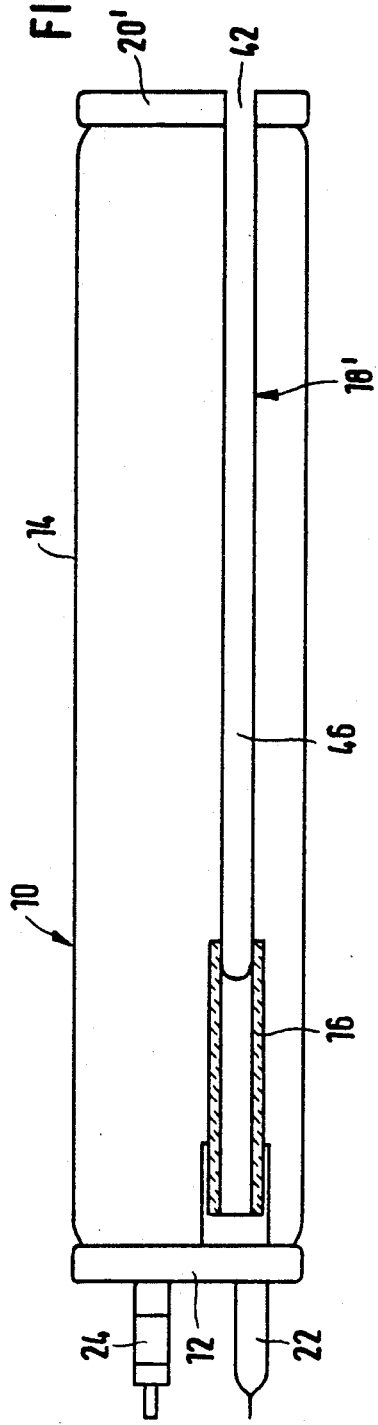
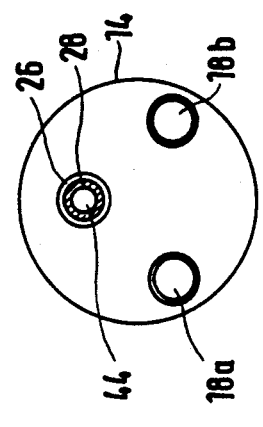
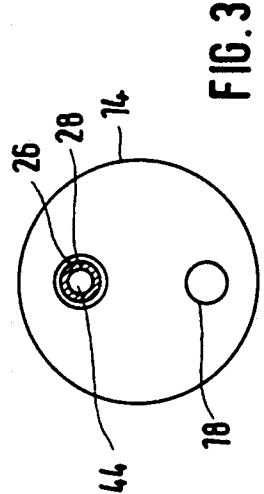

APPARATUS FOR PREIONIZATION OF GAS IN A PULSED GAS LASER

The invention relates to an apparatus for preionization of gas in a pulsed gas laser by means of X-ray radiation.

Pulsed gas lasers are known in a great variety of configurations, in particular as $CO_2$ laser, excimer laser or $N_2$ laser, etc. A so called transverse stimulation of the laser gas in the form of a gas discharge (also referred to as main or plasma discharge) is widely used in pulsed gas lasers.

It is also known to subject the laser gas prior to the main discharge to a so called preionization in which before the actual main discharge as homogeneous as possible a distribution of free electrons (about $10^7$ electrons/$cm^3$) is produced in the discharge space. Such a preionization of the gas serves in particular to avoid the main discharge taking place as arc discharge. After the preionization, between the main electrodes of the laser the so called main discharge starts in which the electron concentration in the so called avalanche phase is multiplied by several orders of magnitude, for example even $10^{14}$ to $10^{15}$ electrons/$cm^3$.

As a rule, in the prior art for the preionization external energy sources, for example UV light, are employed, i.e. separate form the actual main discharge. Such UV radiation can for example be emitted by spark gaps or also by corona discharges.

Although spark gaps are extremely effective, they have the disadvantage that they form a source of contamination for the laser gas and also for the optical components of the laser resonator. The efficiency of a preionization by means of UV radiation is restricted in particular by the fact that the range of the ionizing UV radiation is limited to a few centimeters (cf. K. Midorikawa, M. Obara, T. Fujiokam, IEEE QU-20, 1984, p. 198).

The present invention proceeds from the recognition that a preionization with soft X-ray radiation is particularly advantageous and overcomes the aforementioned disadvantages. Although known for a relatively long time (S. Sumida, M. Obara, T. Fujioka, Appl. Phys. Lett. 33, 1978, p. 913), soft X-ray radiation has so far not been used to any appreciable extent in gas discharge lasers. This might be due to the fact that it was assumed that X-ray radiation requires a considerable additional expenditure, in particular as regards the X-ray source of the high-voltage pulse generator with 80 to 100 KV peak voltage, the time synchronization electronics and the shielding. Consequently, for a long time there has been a need for a reliable economically manufacturable X-ray which is simple to operate and which can produce the necessary dosage power for preionization in a pulsed gas laser and has as well a long life.

In addition, for the preionization of excimer gas mixtures it must be remembered that in said gas mixtures electronegative gases, such as HCl or $F_2$, are also present which greatly reduce the life of the free electrons, for example to a few nanoseconds (the free electrons are "captured" by the electronegative gases). For this reason, the preionization here must also take place in a very short time pulse of a few nanoseconds. To achieve the electron concentration of for example $10^7$ $cm^{-3}$ required for a good preionization within this short period of time, the X-ray radiation source must have a very high peak intensity in this short period of time. Converted to the anode current of an X-ray tube this requirement demands anode currents of 500 to 1000 A. In contrast, conventional X-ray tubes have emission currents of at the most a few amperes.

In EP 0 336 282 A1 a plasma cathode is described but for its operation requires a gas pressure which has to be maintained exactly and additional voltage pulses for various control grids and control electrodes.

JP 63-217 678 (A) describes an X-ray radiation source for preionization in a pulsed gas laser in which a heating wire is connected to high voltage with respect to the anode so that electrons emitted from the wire are accelerated to the anode. The anode is angled and arranged behind a main discharge electrode of the laser. X-ray radiation generated passes from behind through one of the main electrodes of the laser. The arrangement of heated cathode and anode is accommodated in a housing which is fixedly connected to one of the main electrodes of the laser.

In JP 63-217 677 (A) an X-ray radiation source for preionization in a pulsed gas laser is described in which a hot cathode and a cold cathode are arranged behind one of the main electrodes of the laser. This main electrode forms at the same time the anode for the X-ray generation, electrons emitted by the cathodes being accelerated with respect to the main electrode to generate X-ray radiation which passes between the two main electrodes of the laser.

In the British journal IEEE PROC., Vol. 128, Pt. 1, No. 1, February 1981, p. 19-32 (article by J. L. CRONIN "Modern dispenser cathodes") general principles are described for cathode materials in dispenser cathodes.

In JP 1-128 482 (A) a heating spiral is described as incandescent cathode, i.e. the heating spiral emits electrons directly which are accelerated against a body and on striking the body generate X-ray radiation. The components for generating the X-ray radiation are integrated into one of the main electrodes of the laser.

U.S. Pat. No. 4,592,065 also describes an apparatus for generating X-rays for a pulsed gas laser in which the X-ray generating means is integrated into one of the main electrodes of the laser. Electrons emitted by an electrode are accelerated directly onto the main electrode of the laser to generate X-ray radiation for the preionization.

The invention is based on the problem of providing an apparatus for the preionization of laser gas in a pulsed gas laser by means of X-ray radiation, in particular soft X-ray radiation, which is economical to make, functions reliably, has a long life, is simple to operate and produces the dosage power required for a good and homogeneous preionization in a relatively large discharge cross-section.

According to the invention this problem is solved by an apparatus for preionization of gas in a pulsed gas laser by means of X-ray radiation comprising an elongated cathode which is made tubular and has an inner cavity in which a heating spiral is arranged which by thermal radiation heats the cathode so that the latter emits electrons, and an elongated anode arranged parallel to the cathode, the cathode and the anode being accommodated in an evacuated housing which at least in one portion is permeable to the X-ray radiation.

An alternative embodiment of the invention solves the problem with an elongated cathode which is made tubular and has an inner cavity in which an elongated heating wire is spanned concentrically to the cathode and is applied to an electrically negative potential with respect to the cathode and emits electrons which are accelerated towards the cathode so that the cathode is also heated due to the electron bombardment and in turn emits electrons, and at least one elongated anode arranged parallel to the cathode, the cathode and the anode being accommodated in an evacuated housing which at least in one portion is permeable to the X-ray radiation.

The cathode is preferably tubular and consists substantially of tungsten. Particularly preferred is porous impregnated tungsten as known per se (IEEE Proc. Vol. 128, Pt. I, No. 1, p. 19), which is distinguished by relatively low operating temperatures of 1000° to 1100° C. and achieves high emission currents (so called dispenser cathodes).

According to another preferred further development of the invention the cathode is heated by means of a heating spiral which is arranged in a cavity in the cathode.

Alternatively, the cathode may also be heated by electron bombardment known per se.

Preferably, the elongated cathodes and anodes aligned parallel to each other are supported axially on both sides to obtain insulation paths as long as possible in the tube and thus avoid flashovers. Due to its compact construction, the X-ray tube according to the invention can be positioned in the immediate vicinity of the main electrodes so that the radiation can be coupled with high efficiency into the medium to be subjected to preionization.

According to another preferred further development of the invention the anode is hollow on the inside and the cavity thereof communicates via a passage with a liquid reservoir outside the housing.

With the construction of the apparatus for preionization according to the invention the X-ray radiation is not radiated into the space in which the gas is to be preionized (as is mostly the case in the prior art discussed above) but instead, due to its construction, the apparatus according to the invention is not integrated into the discharge electrodes of the laser or connected to the latter but can be positioned remote therefrom. The apparatus according to the invention can even be arranged outside the laser chamber and this permits the use of any desired electrode materials. This in turn has a positive effect on the electrode life of the laser.

Hereinafter an example of embodiment of the invention will be explained in detail with the aid of the drawings, wherein:

FIG. 1 shows an axial section through an X-ray tube;
FIG. 2 shows an axial section through an example of embodiment of an X-ray tube modified compared with FIG. 1;
FIG. 3 shows a radial section through an X-ray tube according to FIG. 1; and
FIG. 4 shows a radial section through a modified embodiment of an X-ray tube.

The X-ray source described in detail hereinafter as proposed by the invention is a vacuum tube in the original sense of that term. The operation thereof therefore requires no vacuum pumps and no gas metering means. Also, no additional voltage pulses are required for control grids and control electrodes. The only operating voltages required are a heating voltage for heating the cathode and a pulse-like accelerating voltage at the anode.

According to FIG. 1 and the corresponding radial section of FIG. 3 the X-ray tube 10 has a base plate 12 which serves also as mounting flange and carries a housing 14. In the example of embodiment illustrated the housing 14 is a glass tube which is permeable to the soft X-ray radiation generated.

Mounted on the base plate 12 is an anode holder 16 supporting the elongated tubular or rod-like anode 18. A counter plate 20 is mounted on the side of the elongated tubular housing 14 of electrically insulating material opposite the base plate 12 so that the interior of the housing 14 is sealed vacuum-tight.

In the production of the X-ray tube 10 the latter is evacuated, possibly with corresponding heating in the operating state, and sealed at a glass tube 22. Thereafter the X-ray tube is ready for operation without further evacuation steps.

The base plate 12 carries an electrical bushing 24 via which the heating current can be introduced into the interior of the X-ray tube.

In the example of embodiment illustrated a cathode 26 is provided which is made tubular. The length of the cathode and accordingly the length of the anode are so chosen that these dimensions are adapted to the laser gas discharge volume.

To achieve high emission currents the tubular cathode 26 consists of porous tungsten (so called dispenser cathode). This material is distinguished by a very low operating temperature of 1000° to 1100° C. and is known per se (see above).

A particularly simple embodiment reliable in operation and having a long life is achieved if the tubular cathode is heated to the necessary temperatures with the aid of a heating spiral 30 (electrical resistance heating). The cathode 26 is hollow on the inside and a ceramic tube 28 separates the cathode 26 from the heating spiral 30.

Corresponding to the anode 18, the cathode 26 is also supported axially on both sides, this being done by insulating cathode holders 32, 34.

Metal sleeves 36, 38 are shrunk onto the cathode holders 32, 34 formed from ceramic so that the cathode 26 is supported in an electrically and thermally insulated manner.

The cathode 26 is connected to ground potential (as is the base plate 12) via an electrical conductor 40. Thus, electrical insulation with respect to the anode 18 is necessary. A pulsed high voltage (not shown in detail) is applied to the anode 18.

It has been found that to achieve best preionization results and a long life of the cathode particular dimensions are advantageous. Favourable values were obtained with a cathode inner diameter of 6 mm, a cathode outer diameter of 8 mm, an outer diameter of the heating spiral of 4.5 mm and a pitch of the heating spiral of 1.5 mm per turn as well as a wire diameter of the heating spiral of 0.7 mm. Deviations from these values of up to 30% also furnish good results. The cathode has an axial length of more than 20 cm up to a multiple thereof, such as 50 cm.

The feedback of the heating current can take place via the cathode itself, cf. the conductor 48 in FIG. 1.

A uniform spiral pitch of the heating coil or spiral 30 is important for obtaining a requirement important for the operation of the X-ray tube, i.e. a homogeneous temperature distribution over the entire cathode length. With the values given above the necessary heating power is about 25 W per cm cathode length and the heating current is about 12 A.

In modification of the example of embodiment described above the cathode heating may also take place by electron bombardment. In this case a heating wire held concentrically with the cathode tube would have to be operated with a few KV negative with respect to the cathode.

In its simplest embodiment according to FIG. 1 the anode 18 consists of a metal rod having a diameter of 6 mm (with deviations of 30%) and is supported at about 13 mm distance away from the cathode 26. The anode holder 16 consists of an electrically insulating material, for example ceramic. For a high X-ray yield an anode material as heavy as possible should be selected. Tungsten and tantalum have proved suitable. It has been found that the X-ray tube 10 can be operated suitably with 70 KV anode peak voltage, a pulse width of 30 ns and a repetition rate of up to 500 Hz.

If still higher pulse repetition rates are desired the anode can be cooled to avoid excessive operating temperatures. Such a cooling is illustrated in FIG. 2 in the modification of the example of embodiment of FIG. 1. Corresponding to FIG. 1, FIG. 2 also shows an axial section through an X-ray tube 10, the cathode and the parts associated therewith being constructed in accordance with FIG. 1 and for that reason will not be illustrated again. The modification relates to the anode 18' which in the example of embodiment according to FIG. 2 is made hollow on the inside. The cavity 46 of the anode 18' is connectable via a passage 42 to a reservoir for cooling liquid which is disposed outside the housing 14. The cooling may for example be carried out with oil. The electrical potential of the anode is defined by the potential of the counter plates 20 or 20' to which the anode is conductively connected.

The electrical potential of the anode is defined by the potential of the counter plates 20 or 20' to which the anode is conductively connected.

With the above dimensions the X-ray tube can be operated at 70 KV anode peak voltage close to the space charge limit of about 20 A per cm diode length. Operation in the region of this saturation value has the advantage that the X-ray emission current no longer depends sensitively on the cathode temperature and consequently stable operating conditions can be achieved without sensitive setting of the parameters.

FIG. 4 shows a modification of the example of embodiment, two anodes 18a, 18b being arranged triangularly opposite a cathode 26. This arrangement is recommendable for example when the X-ray tube 10 is to radiate primarily upwardly (seen in the direction of the Figures). The emission current is no longer limited as regards space charge in this arrangement but on the contrary results from the emissivity of the cathode at the operating temperature set or from the impedance of the high-voltage pulse generator.

It is possible to improve the stability of the vacuum by a so called getter material.

After assembly of the components described above the X-ray tube 10 is first evacuated, baked out and then activated in accordance with the recommendations of the cathode manufacturer, the cathode being heated for a short time above its normal operating temperature. Thereafter the housing 14 is sealed in vacuum-tight manner, for example by sealing off the glass tube piece 22 to which the vacuum pump was previously connected. Thereafter operation of the X-ray tube for years is possible without additional evacuating steps. The construction of the X-ray tube described has proved to be robust and long-lived. The compact configuration with the dimensionings given makes it possible to position the X-ray source in the immediate vicinity of the discharge space to be preionized.

We claim:

1. An apparatus for preionizing gas in a pulsed gas laser by means of x-ray radiation, said preionizing apparatus comprising:
   an elongated tubular cathode having an inner cavity including a heating spiral for heating the elongated tubular cathode and thereby emitting electrons from the elongated tubular cathode;
   an elongated anode arranged parallel to the elongated tubular cathode so that electrons emitted by the elongated tubular cathode impinge onto the anode producing x-ray radiation and thereby preionizing a laser gas external to said preionizing apparatus and
   an evacuated housing for accommodating the cathode and the anode, said evacuated housing having at least one portion permeable to the x-ray radiation.

2. Apparatus according to claim 1 further comprising a ceramic tube which is concentric to the elongated tubular cathode and is arranged between the heating spiral (30) and the elongated tubular cathode (26).

3. An apparatus for preionizing gas in a pulsed gas laser by means of x-ray radiation, said preionizing apparatus comprising:
   an elongated tubular cathode having an inner cavity;
   an elongated heating wire concentrically disposed within the cavity and extending the length thereof, said heating wire having applied to it an electrically negative potential with respect to the elongated tubular cathode, whereby said cathode emits electrons upon bombardment by electrons from the elongated heating wire when said elongated heating wire is heated;
   at least one elongated anode arranged parallel to the elongated tubular cathode so that the electrons emitted by the elongate tubular cathode impinge onto the elongated anode and generate x-ray radiation which thereby preionizes a laser gas external to said preionizing apparatus; and
   an evacuated housing for accommodating the elongated tubular cathode and at least one elongated anode, said evacuated housing having at least one portion which is permeable to the x-ray radiation.

4. Apparatus according to claim 1 or 3, characterized in that the elongated tubular cathode (26) consists of porous impregnated tungsten.

5. Apparatus according to claim 1 or 3, characterized in that support means for the elongated tubular cathode (26) is provided in the housing (14) and the support means is arranged axially on both sides of the cathode (26).

6. Apparatus according to claim 1 or 3, characterized in that the anode (18') comprises a cavity which communicates via a passage (42) with a cooling liquid reservoir arranged outside the housing (14).

7. An apparatus according to claim 1 or 3, wherein the elongated anode is axially supported in the housing on both sides of the elongated anode.

* * * * *